H. R. GILSON.
MECHANISM FOR MAKING ARMORED CABLE AND SIMILAR PRODUCTS.
APPLICATION FILED MAY 12, 1910.
1,004,643.
Patented Oct. 3, 1911.
4 SHEETS—SHEET 1.
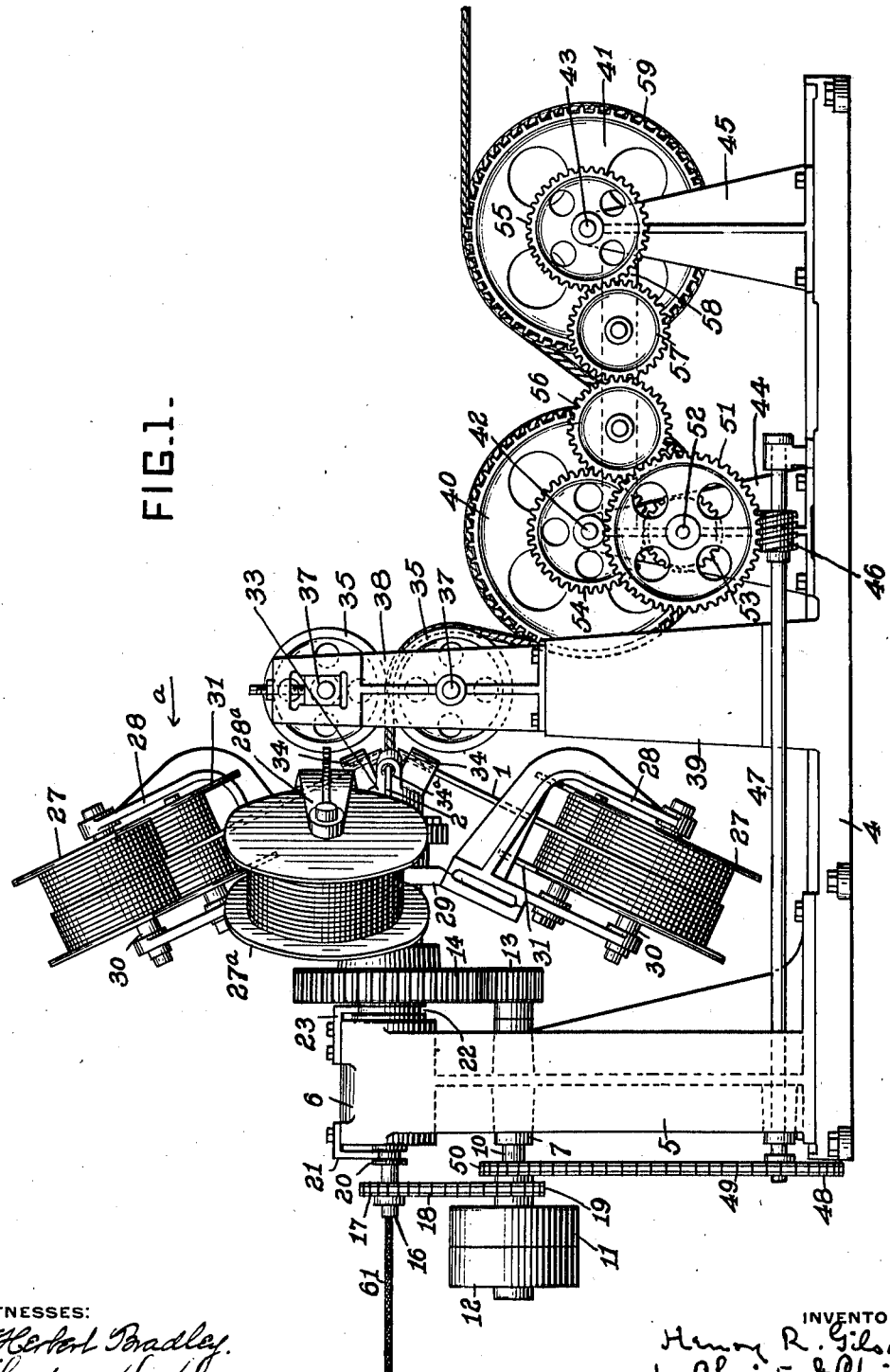
WITNESSES:
INVENTOR H. R. GILSON.
MECHANISM FOR MAKING ARMORED CABLE AND SIMILAR PRODUCTS.
APPLICATION FILED MAY 12, 1910.
1,004,643.
Patented Oct. 3, 1911.
4 SHEETS—SHEET 2.
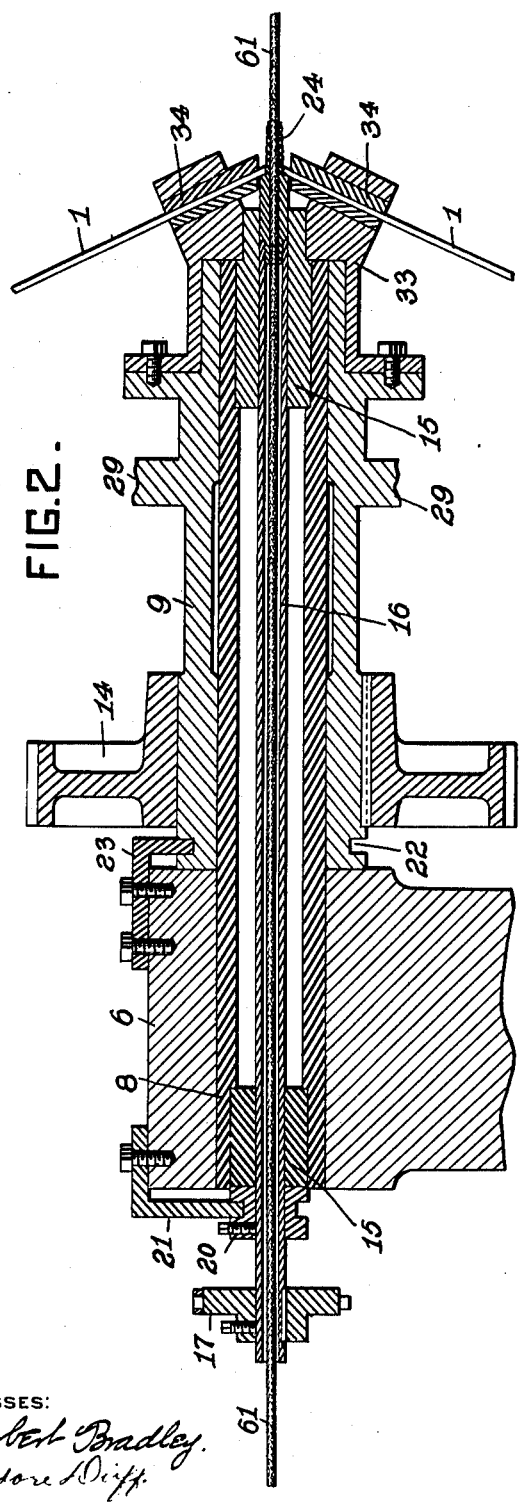
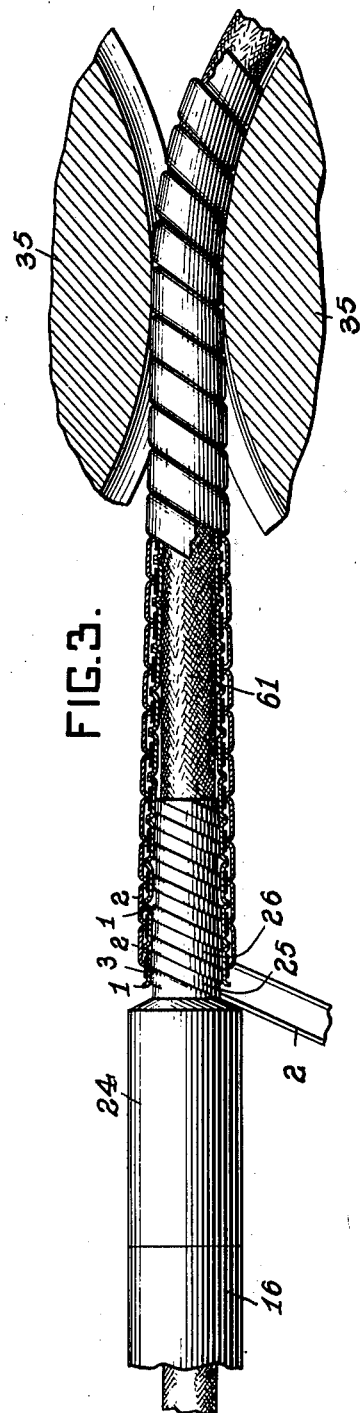

H. R. GILSON.
MECHANISM FOR MAKING ARMORED CABLE AND SIMILAR PRODUCTS.
APPLICATION FILED MAY 12, 1910.
1,004,643.
Patented Oct. 3, 1911.
4 SHEETS—SHEET 3.
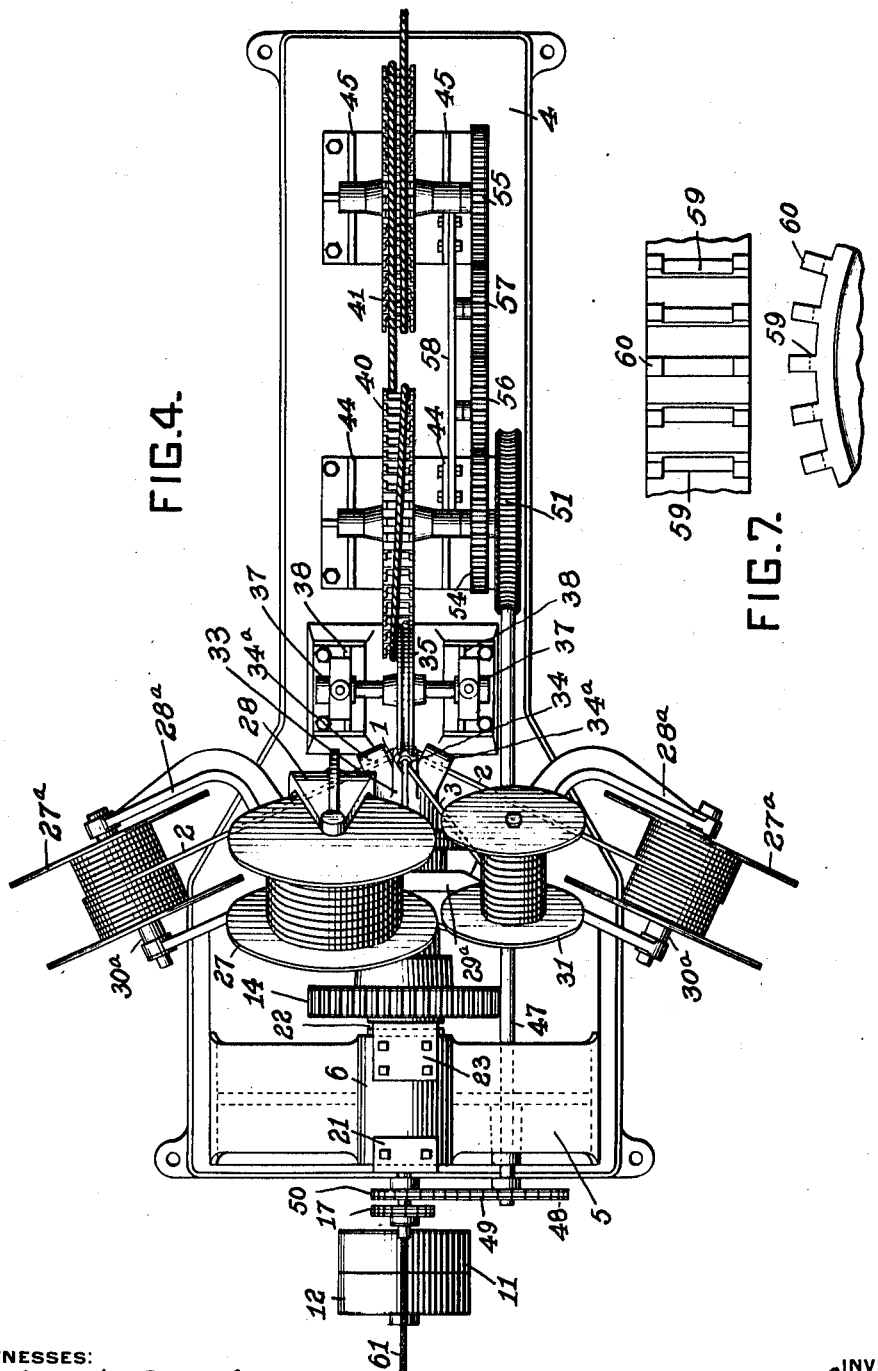
WITNESSES:
INVENTOR H. R. GILSON.
MECHANISM FOR MAKING ARMORED CABLE AND SIMILAR PRODUCTS.
APPLICATION FILED MAY 12, 1910.
1,004,643.
Patented Oct. 3, 1911.
4 SHEETS—SHEET 4.
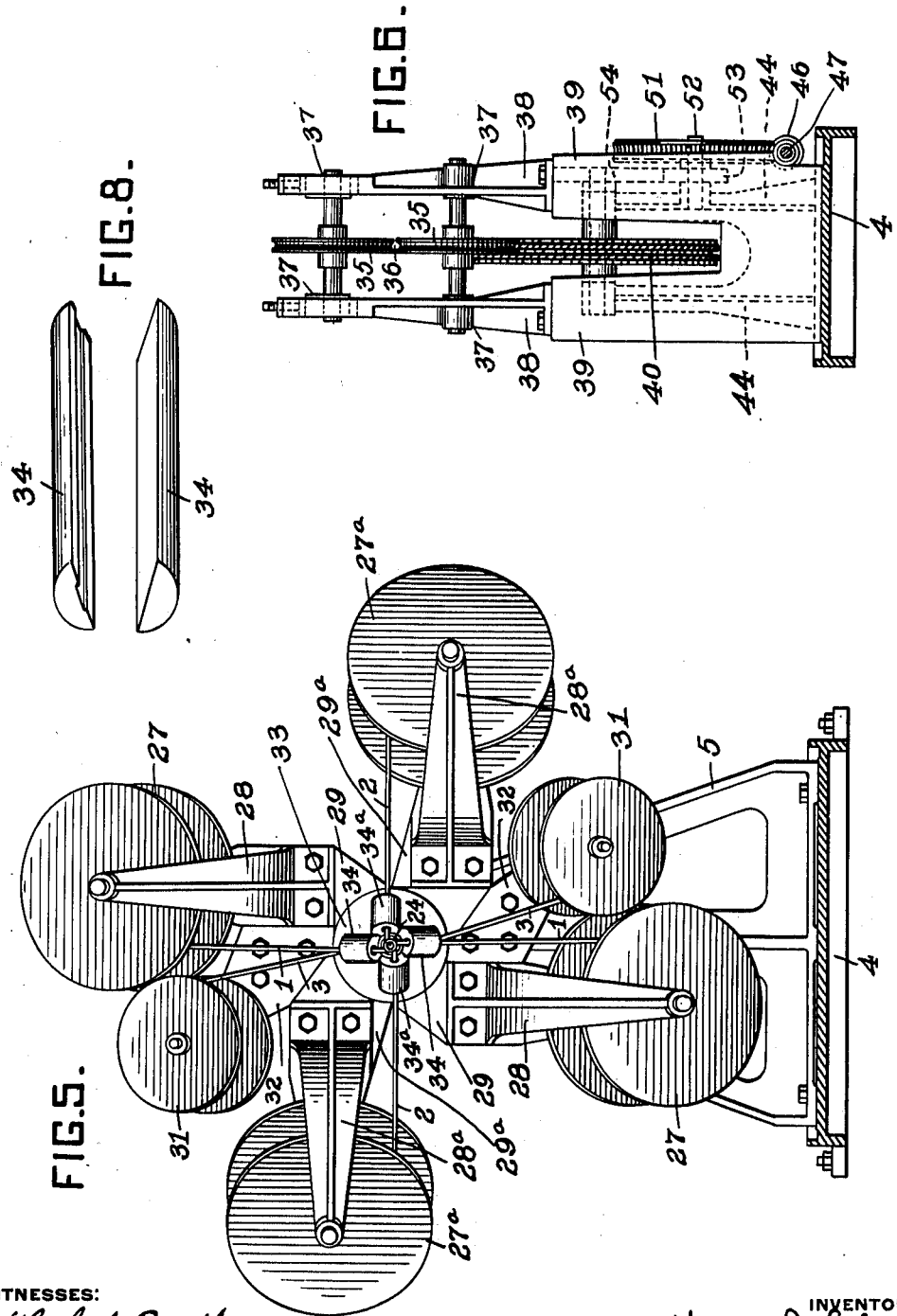
WITNESSES:
J. Herbert Bradley
Theodore Duff
INVENTOR
Henry R. Gilson
by Christy & Christy
Att'ys

UNITED STATES PATENT OFFICE.

HENRY R. GILSON, OF FAIR OAKS, PENNSYLVANIA, ASSIGNOR TO NATIONAL METAL MOLDING COMPANY, OF PITTSBURGH, PENNSYLVANIA, A CORPORATION OF PENNSYLVANIA.

MECHANISM FOR MAKING ARMORED CABLE AND SIMILAR PRODUCTS.

1,004,643. Specification of Letters Patent. Patented Oct. 3, 1911.

Application filed May 12, 1910. Serial No. 560,857.

*To all whom it may concern:*

Be it known that I, HENRY R. GILSON, residing at Fair Oaks, in the county of Allegheny and State of Pennsylvania, a citizen of the United States, have invented or discovered certain new and useful Improvements in Mechanism for Making Armored Cable and Similar Products, of which improvements the following is a specification.

It is the object of the invention to provide improved mechanism for forming upon electric cables an armor composed of a metallic strip or strips applied helically thereon, in such manner that the armored cable shall be flexible.

The invention is also applicable, as will be apparent to those skilled in the art, to the manufacture of flexible metallic tubing, either with or without an inner flexible core.

In the accompanying drawings there is illustrated an organized machine for armoring an electric cable, which embodies the said improvements in preferred form. This machine is shown as adapted for the formation and application to the cable of an armor made up of four metallic strips. Each metallic strip is preferably of the shape shown in cross-section in Figure 3 of said drawings, that is to say, having a substantially flat body portion, and at each edge a flange turned at an angle slightly less than a right angle to the plane of the body portion. Two of said strips 1, 1, are applied to the cable side by side, with their flat backs bearing against the cable and their flanged edges projecting outwardly, while the two other or outer strips 2, 2, are applied upon said inner strips in reverse position, that is to say, with their flanged edges turned inwardly, and the respective flanges of each outer strip bearing upon the body and between the flanges of adjacent inner strips, so that the body of each outer strip will bridge the adjacent flanges of adjacent inner strips. By this construction the said inner and outer strips will be held in proper relation, the one by the other, while at the same time the coils will have a limited range of movement relatively to each other, in order to give to the completed structure the desired flexibility. It is also preferred to employ a filling strip 3, which may be of any suitable compressible material, such as paper, in the channel between the flanged edges of each of the inner strips, and upon which the flanged edges of the outer strips will bear.

In the said accompanying drawings Fig. 1 is a side elevation of the machine. Fig. 2 is a sectional elevation, on a larger scale, of the coiling-frame and mandrel-shaft omitting the reels which carry the strips to be coiled. Fig. 3 is a view in approximately full size, showing the mandrel in elevation, and the strips in section as applied to the cable. Fig. 4 is a plan view of the machine. Fig. 5 is an end elevation of the parts at the left of the rolls 35, Fig. 1, looking in the direction of the arrow $a$. Fig. 6 is an end elevation of the rolls 35, looking in the opposite direction. Fig. 7 shows in plan and in elevation a portion of the rim of one of the take-off wheels. Fig. 8 is a view in perspective of the two halves of one of the guides for the strips.

Upon the rear end of the base 4 is bolted or otherwise secured the standard 5, at the top of which is formed the bearing block 6, and beneath the block 6 a second bearing-block 7. Fastened in the block 6 and projecting inwardly therefrom is a fixed hollow bearing-shaft 8, upon the projecting portion of which is mounted the rotating sleeve 9 which carries the coiling-frame to be hereinafter described. In the lower block 7 is mounted the main driving-shaft 10, having at its outer end the fast and loose pulleys 11 and 12 for a driving-belt connected to any suitable source of power. To the inner end of shaft 10 is fastened the pinion 13, which is in mesh with and drives the pinion 14 fastened to the sleeve 9.

Within the bearing-shaft 8 at its opposite ends are the bushings 15, which serve as bearings for the rotating mandrel-shaft 16. To the outer or rear end of the mandrel-shaft is fastened the sprocket-wheel 17, connected by chain 18 with the sprocket-wheel 19 fastened on the driving-shaft 10. The sprocket-wheels 17 and 19 are shown as of substantially the same diameter, so that the mandrel-shaft 16 will be rotated in the same direction and at substantially the same speed as the shaft 10. On the other hand, the pinion 13 on shaft 10, which meshes directly with pinion 14 on sleeve 9, is shown as of less diameter than said pinion 14, so that the sleeve 9 will be rotated in the direction opposite to that of the rotation of the mandrel-shaft 16, and at a slower speed.

The mandrel-shaft 16 is preferably provided, at a point adjacent to the outer end of block 6, with a grooved disk 20, and the end of a finger or lip 21, fastened to the block 6, projects into the groove in said disk, in order to more firmly secure the mandrel-shaft against any longitudinal movement. The sleeve 9 is also preferably provided, adjacent to the opposite end of block 6, with a similar annular groove 22, into which projects the end of the finger or lip 23 secured to that end of block 6, in order to more firmly secure the said sleeve 9, and parts carried thereby, against longitudinal movement.

The mandrel 24 is fastened to the front or inner end of the mandrel-shaft 16, and projects beyond the fixed shaft 8 and bushing 15 at that end. In case the machine is to be used, as herein shown and described, for forming the flexible metallic tubing directly upon, and thus armoring, a cable, conductor or core, the mandrel-shaft and mandrel must be hollow, in order to permit the unarmored cable or core to pass through their bore.

The strip-bearing surface of the mandrel 24 is slightly tapered, and has formed thereon a helical shoulder or shoulders. In the drawing there are shown two of such shoulders formed by a pair of parallel helical grooves 25 and 26 running throughout the length of the said bearing-surface of the mandrel. While this is the preferred construction, it will presently appear that in many cases a single shoulder may be sufficient, and that it need not necessarily run the entire length of the said bearing-surface.

The metallic strips to be coiled, which have preferably been previously flanged along their edges to give them the form shown, are carried upon and drawn from reels carried by the rotating sleeve 9. In the machine shown, the two inner strips 1, 1, are carried upon reels 27, rotatably mounted in frames 28, secured to arms 29, which project radially from the sleeve 9 at diametrically opposite points. Reels 27ª for the two outer strips 2, 2, are similarly mounted in frames 28ª, secured to the arms 29ª, projecting from the sleeve 9 between and at equal distances from the arms 29. The reels are preferably mounted on journals 30, 30ª, removably secured in the respective frames in the manner shown in Fig. 4. Reels 31 for the two lining or filling strips 3, 3, are carried by arms 32 fastened to the arms 29 adjacent to the reels 27 for the inner strips.

Upon the inner end of the sleeve 9 is fastened the coiling-head 33, in which are mounted the guides 34, 34ª, for the strips, so arranged about the mandrel as to direct the strips forwardly tangentially upon the mandrel surface, as shown in Fig. 5. The guides are inclined forwardly at an angle to the axial line of the mandrel corresponding to the angle of pitch to be given to the coiled strips, and the reels and their respective guides should be so arranged that the strips will pass from the reels to the mandrel in approximately straight lines, as shown in Figs. 1 and 4. The guides 34 for the inner strips are disposed oppositely to each other, so as to direct the said strips to and upon the mandrel surface at diametrically opposite points adjacent to its base. The guides 34ª for the outer strips are also oppositely disposed in the head at distances of ninety degrees from the guides 34, but at a distance forward over the mandrel required by the pitch to be given to the coiled strips, in order that the outer strips may be continuously coiled upon the coiled inner strips in the manner hereinbefore described. The filling strips 3, 3, are caused to enter the guides 34 for the inner metallic strips 1, 1, together with and between the flanged edges of the latter, as shown in Fig. 5.

The sleeve 9, with the arms, reels and coiling-head carried thereby together make up what has been hereinbefore termed the coiling-frame.

The helical grooves on the mandrel run in the direction opposite to that of its rotation, and the shoulders or abutments formed by the rear walls of the grooves are, by reason of the slight taper of the mandrel, enabled to abut against the rear edges of the inner strips as the latter are continuously coiled upon the mandrel surface. Since the mandrel is rotated in the direction opposite to that of the rotation of the coiling-frame and head, and at a higher rate than the latter, the said helical shoulders act to continuously push the formed coils forwardly along the tapered surface of the mandrel, thereby continuously drawing the strips from the reels. During this operation the reverse tension of the coiling-frame upon the strips draws the coils closely upon the tapering surface of the mandrel as they are fed forward, and thence from the tip of the mandrel down upon the surface of the cable, as shown in Fig. 3, so that the coils frictionally grip the surface of the cable and draw the latter continuously forward as the said coils are themselves continuously pushed forward.

The speed of rotation of the mandrel should be sufficiently higher than that of the rotation of the coiling-head to effectively feed the coils forward as fast as they are formed. In forming an armored cable of the size shown in Fig. 3, I have attained good results by giving the mandrel three revolutions to one revolution of the coiling-frame and head, each of the grooves on the mandrel being one-eighth of an inch wide and encircling the mandrel twice to the inch.

It is obvious that the helical abutment or abutments need not run the full length of the bearing-surface of the mandrel, and that they may be formed otherwise than by grooving the mandrel, but the construction shown is believed to be most effective. The employment of two abutments is also not essential, more particularly if a two-strip, instead of a four-strip, armor is to be formed. But if a single abutment only were used in forming the armored cable herein shown and described, it would be necessary to rotate the mandrel at substantially double the speed, thus greatly increasing the friction and the heat thereby generated.

Adjacent to the end of mandrel 24, and preferably as near thereto as possible, are mounted the sizing-rolls 35, the peripheries of which are grooved, as shown, to form a pass 36 between them of the desired size of the finished armor cable or tubing. These sizing-rolls may be mounted, as shown, in suitable bearings 37, supported in the opposite frames 38 mounted upon standards 39. The bearings of the upper roll may be adjustable as shown. And while these rolls are shown as idle rolls, they may of course be driven if desired. By its passage through these sizing-rolls the cable is made of uniform diameter throughout its length, and they impart to the metal of the coils a firm and permanent set. The backward pull of the coiling-head upon the strips takes up the slight slack caused by the sizing and compression of the coils. As it issues from the pass 36 the finished cable or tube is given an abrupt bend, at approximately right-angles to its line of movement, preferably by drawing or directing it downwardly over the periphery of the lower sizing-roll, as shown. This bending of the product causes the coils to bind against each other beneath the bend and at once relieves any torsional strain which may have been imparted to it by the formation of the coils, so that it passes to the take-off mechanism, to be presently described, without twisting or kinking. This feature of the present invention may be utilized in machines of different forms, and it is intended to cover broadly herein any suitable means for imparting to the cable or tube an abrupt bend, whereby its tendency to twist or to kink is overcome or neutralized, irrespective of the form of machine in or in connection with which such means may be employed.

The product may, if desired, be passed directly from the sizing-rolls to a suitable winding-reel, but it is preferred to employ between the sizing-rolls and the winding-reel a suitable take-off mechanism, to exert an even drawing tension upon the product and feed it evenly to the winding-reel, not shown. This take-off mechanism preferably consists of a pair of driven wheels 40 and 41, arranged in tandem, having shafts 42 and 43 respectively, mounted in suitable bearings in the standards 44, 44, and 45, 45. These wheels are shown as driven by means of a worm 46 on the longitudinal shaft 47, mounted in suitable bearings at one side of the base of the machine. Attached to the rear end of the shaft 47 is a sprocket-wheel 48, which is connected by a chain 49 with a sprocket-wheel 50 on the main driving-shaft 10. The worm 46 meshes with and drives the worm-wheel 51 on a stub-shaft 52, mounted in a bearing in the adjacent standard 44, said shaft 52 also having the pinion 53 beneath and meshing with the pinion 54 on the end of shaft 42. A corresponding pinion 55 on the end of shaft 43 is connected to and driven by the pinion 54 through the intermediate pinions 56 and 57 on stub-shafts projecting from bearings formed in the bar 58, which is fastened at its opposite ends to the standards 44 and 45 at the same side of the machine. The operating connections are so arranged that the wheels 40 and 41 will be driven at the same speed, which will be such as to take up the product as fast as it is formed. The wheels are preferably driven in opposite directions, as shown, and the product is preferably caused to make at least one complete turn around each of said wheels. The wheels are also preferably provided with roughened peripheral surfaces, as by means of the teeth 59, Fig. 7, in order to prevent the product from slipping. Marginal abutments 60 may be provided to retain the product on the wheels. After the product has passed around the take-off wheels, it may go to a winding-reel, not shown, which may be of any suitable form.

In the operation of the machine shown and described, the cable 61 to be armored is drawn from a reel, not shown, and is led through the hollow bore of the mandrel-shaft and mandrel. The metal strips and lining strips are then led through their respective guides in the head 33, as already explained. A few coils may then be applied to the cable by hand, and secured thereto. The machine may then be started, and the product led through the pass between the sizing-rolls and around the take-off wheels, in the manner described, and its end secured to the winding-reel. The operation will then proceed automatically, the coiling-frame and mandrel coöperating in the manner described to form the coils and to feed the product forward through the sizing-rolls.

It will be apparent to those skilled in the art that the machine herein described may be readily adapted to the manufacture of flexible armored cable or tubing from one, two, or any desired number of metallic strips, and that many variations in the apparatus specifically described may be made, without departure from the present invention. Also certain features of the invention may be utilized in machines of other types than that herein shown.

No claim is made herein to the 4-strip armored cable or tubing described; nor to the method of manufacture which the machine is adapted to practice, since these inventions respectively constitute the subject-matter of other applications for Letters Patent filed by me, Serial No. 513,666 and Serial No. 560,858.

I claim as my invention:

1. In a machine of the class described, the combination of a tapering mandrel having a helical abutment, a coiling member for laying a strip in engagement therewith, means for moving the coiling member around the mandrel, and means for rotating the mandrel in the opposite direction.

2. In a machine of the class described, the combination of a mandrel having a helical abutment, a coiling member for laying a strip in engagement therewith, means for moving the coiling member around the mandrel, and means for rotating the mandrel in the opposite direction and at a higher rate than that of the movement of the coiling member.

3. In a machine of the class described, the combination of a tapering mandrel having on its surface a helical groove, a coiling member for laying a strip in engagement therewith, means for moving the coiling member around the mandrel, and means for rotating the mandrel in the opposite direction.

4. In a machine of the class described, the combination of a tapering mandrel having on its surface a pair of parallel helical grooves, a coiling member for laying a strip in engagement therewith, means for moving the coiling member around the mandrel, and means for rotating the mandrel in the opposite direction.

5. In a machine of the class described, the combination with a mandrel having on its surface a helical abutment, guides for the strips to be coiled arranged to direct the strips upon the mandrel at a forward inclination, means for rotating the guides around the mandrel, and means for rotating the mandrel in the opposite direction.

6. In a machine of the class described, the combination with a coiling-head, of guides for the strips to be coiled mounted thereon with a forward inclination, a mandrel in line with the guides and having on its surface a helical abutment, means for rotating the coiling-head, and means for rotating the mandrel in the opposite direction.

7. In a machine of the class described, the combination with a coiling-head, and a tapering mandrel arranged centrally thereof and having on its surface a pair of parallel helical grooves, of a pair of guides for strips to be coiled oppositely disposed in the coiling-head adjacent to the mandrel and with a forward inclination, a second pair of guides for strips similarly disposed between and in advance of said first pair of guides, means for rotating the coiling-head, and means for rotating the mandrel in the opposite direction.

8. In a machine of the class described, the combination of a hollow mandrel having a helical abutment, a coiling member for laying a strip in engagement therewith, means for moving the coiling member around the mandrel, and means for rotating the mandrel in the opposite direction.

9. In a machine of the class described, the combination with means for coiling a spirally wound metallic armor upon and in binding engagement with the surface of a cable, whereby the latter is fed forward, of means for compressing and further setting the coils upon the cable.

10. In a machine of the class described, the combination with means for coiling upon a cable a spirally wound metallic armor, of means for abruptly bending the armored cable and causing portions of adjacent coils to momentarily bind against each other, and thereby to neutralize the torsional strain induced by the coiling.

11. In a machine of the class described, the combination with means for coiling upon a cable a spirally wound metallic armor, of means adjacent to the coiling means for compressing and further setting the armor upon the cable, and means for abruptly bending the armored cable as it emerges from the compressing means and thereby neutralizing the torsional strain induced by the coiling.

In testimony whereof, I have hereunto set my hand.

HENRY R. GILSON.

Witnesses:
ALICE A. TRILL,
MARSHALL A. CHRISTY.